Patented Oct. 23, 1945

2,387,617

UNITED STATES PATENT OFFICE 2,387,617

PRODUCTION OF CYCLIC OXYGEN COMPOUNDS

Willi Schmidt and Karl Seydel, Ludwigshafen-on-the-Rhine, Germany; vested in the Alien Property Custodian No Drawing. Application April 19, 1940, Serial No. 330,476. In Germany May 4, 1939

10 Claims. (Cl. 260—586)

This invention relates to the production of cyclic oxygen compounds and more particularly it concerns the production of alicyclic alcohols, ketones and phenols from alicyclic amino compounds containing six-membered carbocyclic rings and one nitrogen atom, the rings being free from substituents other than those containing exclusively carbon and hydrogen atoms.

Cyclohexanol, cyclohexanone and their homologues and analogues in general are extremely valuable as solvents and as starting materials in organic processes. Methods are already known for the production of such alcohols and ketones involving the hydrogenation of phenols in the presence of catalysts.

The present invention is based upon the discovery that alicyclic alcohols, alicyclic ketones and also phenols may be prepared in highly satisfactory yields in a simple manner from nitrogenous starting materials, in particular from certain alicyclic amino compounds. By heating a compound of the type described above, for example cyclohexylamine, methylcyclohexylamine, dicyclohexylamine, phenylcyclohexylamine, decahydronaphthylamine, or mixtures thereof with a hydroxyl-containing compound, such as water or an alcohol, in the presence of a hydrogenation catalyst, alicyclic alcohols are formed together with ammonia or ammonia substituted by the radicle of the hydroxyl-containing compound. Depending on the reaction conditions, these alcohols may be dehydrogenated to form alicyclic ketones or phenols.

In its broadest scope the invention involves heating cyclohexylamine, dicyclohexylamine or phenylcyclohexylamine or their homologues or analogues with a hydroxyl-containing compound in the presence of a hydrogenation catalyst. It is not necessary to carry out this reaction in the presence of hydrogen.

As catalysts there may be used in particular the metals of the 8th group of the periodic table, in particular the non-noble metals, or copper metal or oxidic or sulfidic hydrogenation catalysts. The preparation and the composition of these catalysts have extensively been studied and described in connection with the catalytic hydrogenation of aniline to form cyclohexylamine, with the production of alcohols from fatty acids or their esters or with the conversion of carboxylic acids, ammonia and hydrogen into amines or with the production of amines from carboxylic acid nitriles. These catalysts may be employed either alone or applied to the conventional carrier substances, such as pumice stone, aluminium oxide, fused silica gel and the like. It will be understood that the above given explanation of the catalysts is merely given for purposes of illustration and that the specific catalyst is not an essential part of our invention but that numerous modifications of these catalysts may be made without departure from the spirit of our invention and that any other of the catalysts employed in hydrogenations of the type referred to above may be used.

The reaction according to our invention is preferably carried out under energetic conditions. The catalysts should be employed in a highly active state and the process is conducted preferably at temperatures ranging from 80° to 400° C., and in particular from 100° to 350° C. When working at temperatures exceeding 250° C., there may be formed cyclic ketones by dehydrogenation of the alicyclic alcohols primarily formed. The formation of such ketones may also take place to a substantial extent below 250° C. A substantial excess of the hydroxyl-containing compound over that required to substitute a hydroxyl group for a nitrogenous group, e. g. the amino group, for example from 2 to 50 times, should be employed. Suitable hydroxyl-containing compounds are in particular water, and also low molecular aliphatic alcohols, such as methanol, ethyl, propyl or butyl alcohol and the like. It is self-understood that higher alcohols may also be used but this does not involve economic advantages because too large a radicle attached to the hydroxyl group simply constitutes a diluent decreasing the yield per unit of time and reaction space and slowing up the process.

The reaction may be carried out in the liquid phase or in the gas phase. It is possible to employ inert solvents for the reactants or inert diluent gases when working in the gas phase. Pressure, when employed, may be within the range of from 2 to 100 atmospheres, but higher pressures, such as 150, 200 or more may be employed.

The process may be conducted continuously for example by leading a vaporous mixture of cyclohexylamine and steam through a tube or a plurality of tubes charged with a hydrogenation catalyst. When working continuously in the liquid phase, the liquid mixture of cyclohexylamine and water or alcohol may be boiled under reflux or may be pressed through a vessel wherein the catalyst may be rigidly arranged. The liquid starting material may also be allowed to trickle over the catalyst while leading in counter-current a vaporized hydroxyl-containing compound of the kind defined above.

The actual temperature to be used depends on the activity of the catalyst and on the time of contact between the reaction mixture and the catalyst. In general, the time of contact should be long enough to ensure that the starting material introduced is at least partly subjected to cyclohexanol formation before leaving the catalyst. However, the temperature should not be so high and the time of contact should not be so long as to favor substantially the formation of aromatic or alicyclic hydrocarbons which may occur under too energetic conditions.

Instead of cyclohexylamine or dicyclohexylamine or phenylcyclohexylamine or their homologues there may also be used mixtures of these compounds, for example the mixtures obtained in the hydrogenation of aniline or its homologues.

The following examples serve to illustrate various modifications of our invention. It is, however, not restricted to these examples. The parts are by weight unless otherwise stated.

*Example 1*

Over a catalyst which contains 100 parts of nickel, 2 parts of chromium oxide, 1.5 parts of zinc oxide and 2 parts of barium oxide, which is deposited on pumice stone and which has been reduced in hydrogen at from 300 to 325° C. there are led at 180° C. the vapors of cyclohexylamine and water (ratio by weight 1:3) at a rate of 7 grams of cyclohexylamine per hour for one liter of the catalyst. The cyclohexylamine is completely converted under these conditions. The vapors emerging from the catalyst are condensed, the condensate is freed from water and then distilled. There is obtained for 4 parts of cyclohexanol containing cyclohexanone, 1 part of dicyclohexylamine.

This dicyclohexylamine may be added to fresh cyclohexylamine which is to be subjected to the conversion and thus also be converted into cyclohexanol. The yield of cyclohexanol may thus be increased to from 93 to 95 per cent of the amount calculated on the amount of cyclohexylamine used.

*Example 2*

Vaporized dicyclohexylamine and steam (ratio by weight 1:4) are led at 200° C. over a catalyst as described in Example 1 at a rate of 8 grams of dicyclohexylamine per hour for 1 liter of the catalyst. The vapors emerging from the catalyst are condensed, the condensate freed from water and subjected to a fractional distillation. There are obtained small amounts of benzene and phenol, 60 per cent of a mixture of cyclohexanol and cyclohexanone boiling from 155 to 165° C. and about 35 per cent of a mixture of dicyclohexylamine and phenylcyclohexylamine.

This mixture may be subjected again to the reaction with steam, whereby the yield of cyclohexanol (including the cyclohexanone formed therefrom by dehydrogenation) is increased to almost 90 per cent.

*Example 3*

Over a catalyst which has been used for some time for the conversion of dicyclohexylamine according to Example 2, there are led at 280° C. a vaporous mixture of dicyclohexylamine and water (ratio by weight 1:5) at a rate corresponding to that used in Example 2. The condensate obtained is freed from water and then distilled. There are obtained 66 per cent of cyclohexanone containing small amounts of cyclohexanol, 3 per cent of phenol and 25 per cent of dicyclohexylamine containing a small amount of phenylcyclohexylamine.

*Example 4*

Over a reduced catalyst which contains 100 parts of copper, 1.4 parts of zinc oxide and 3 parts of barium oxide and which is deposited on pumice stone, there is led a vaporous mixture of cyclohexylamine and water (ratio by weight 1:3) at a rate corresponding to that used in Example 2. The condensate obtained is freed from water and distilled. There are obtained 71 per cent of cyclohexanone, containing 8 per cent of cyclohexanol, 7 per cent of phenol and 16 per cent of a mixture of dicyclohexylamine and phenylcyclohexylamine.

When carrying out the process at 340° C. under otherwise identical conditions, there are obtained from the anhydrous condensate 33 per cent of cyclohexanone, 39 per cent of phenol and 21 per cent of a mixture of dicyclohexylamine and phenylcyclohexylamine.

*Example 5*

100 parts of cyclohexylamine, 100 parts of water and 10 parts of the pulverized and reduced catalyst described in Example 1 are boiled under reflux for 48 hours. There are obtained then 84 parts of cyclohexanol and 15 parts of amino compounds which may also be converted into cyclohexanol.

*Example 6*

Over 1000 cubic centimeters of reduced tungsten sulfide there are led per hour at 270° C. 12 grams of a mixture of cyclohexylamine and steam (ratio by weight 1:3). By condensing the reaction gases and distilling the condensate, there are obtained for 100 parts of cyclohexylamine 70 parts of cyclohexanone, containing about 8 per cent of cyclohexanol, and 22 parts of a mixture of dicyclohexylamine and phenylcyclohexylamine.

*Example 7*

Over 100 cubic centimeters of a reduced zinc oxide-copper catalyst containing 2.4 parts of zinc oxide and 2.5 parts of barium oxide for each 100 parts of copper, there are led per hour at 330° C. 12 grams of a vaporous mixture of cyclohexylamine and water (ratio by weight 1:3). By condensing the reaction gases and distilling the condensate, there are obtained for 100 parts of cyclohexylamine 58 parts of cyclohexanone which contain 6 per cent of cyclohexanol, 5 parts of phenol and 27 parts of a mixture of dicyclohexylamine and phenylcyclohexylamine.

*Example 8*

25 cubic centimeters of a mixture consisting of 75 parts of butanol and 25 parts of cyclohexylamine per hour are vaporized and led at 200° C. over 1000 cubic centimeters of the catalyst described in Example 1. The reaction gases are condensed. In the course of 36 hours there are thus obtained 119 grams of butanol, 173 grams of cyclohexanol, containing about 40 per cent of cyclohexanone, 54 grams of dibutylamine and 281 grams of tributylamine.

*Example 9*

10 parts of cyclohexylamine, 30 parts of methanol and 1 part of the reduced and pulverized catalyst described in Example 1 are charged in a pressure-tight vessel. 5 atmospheres of nitrogen are pressed in at normal temperature and the whole is slowly heated to 300° C., whereby the pressure is increased to 450 atmospheres. The reaction mixture is freed from the catalyst and distilled. Cyclohexanol, containing 7 per cent of cyclohexanone is obtained in good yields besides a mixture of cyclohexylamine and dicyclohexylamine.

What we claim is:

1. A process for the production of cyclic oxygen compounds which consists in heating in the absence of added free hydrogen alicyclic mono amino compounds, containing six-membered carbocyclic rings, the rings being free from substituents other than those containing exclusively carbon and hydrogen atoms, in the presence of an excess of a hydroxyl-containing compound selected from the group consisting of water and alcohols and in the presence of a hydrogenation catalyst.

2. A process for the production of cyclic oxygen compounds which consists in heating in the absence of added free hydrogen alicyclic mono amino compounds, containing six-membered carbocyclic rings, the rings being free from substituents other than those containing exclusively carbon and hydrogen atoms, in the presence of an excess of water and in the presence of a hydrogenation catalyst.

3. A process for the production of cyclic oxygen compounds which consists in heating in the absence of added free hydrogen alicyclic mono amino compounds, containing six-membered carbocyclic rings, the rings being free from substituents other than those containing exclusively carbon and hydrogen atoms, in the presence of an excess of water and in the presence of a metallic hydrogenation catalyst.

4. A process for the production of cyclic oxygen compounds which consists in heating in the absence of added free hydrogen to temperatures ranging from 80° to 400° C. alicyclic mono amino compounds, containing six-membered carbocyclic rings, the rings being free from substituents other than those containing exclusively carbon and hydrogen atoms, in the presence of an excess of water and in the presence of a hydrogenation catalyst.

5. A process for the production of cyclic oxygen compounds which consists in heating in the absence of added free hydrogen cyclohexylamine to temperatures ranging from 80° to 400° C. in the presence of an excess of water and in the presence of a hydrogenation catalyst.

6. A process for the production of cyclic oxygen compounds which consists in heating in the absence of added free hydrogen dicyclohexylamine to temperatures ranging from 80° to 400° C. in the presence of an excess of water and in the presence of a hydrogenation catalyst.

7. A process for the production of cyclic oxygen compounds which consists in heating in the absence of added free hydrogen a mixture of cyclohexylamine and dicyclohexylamine to temperatures ranging from 80° to 400° C. in the presence of an excess of water and in the presence of a hydrogenation catalyst.

8. A process for the production of cyclic oxygen compounds which consists in heating in the absence of added free hydrogen to temperatures ranging from 80° to 400° C. alicyclic mono amino compounds, containing six-membered carbocyclic rings, the rings being free from substituents other than those containing exclusively carbon and hydrogen atoms, in the presence of an excess of water and in the presence of a metallic hydrogenation catalyst.

9. A process for the production of cyclic oxygen compounds which consists in heating in the absence of added free hydrogen to temperatures ranging from 80° to 400° C. alicyclic mono amino compounds, containing six-membered carbocyclic rings, the rings being free from substituents other than those containing exclusively carbon and hydrogen atoms, in the presence of an excess of water and in the presence of a metal of the 8th group of the periodic table.

10. A process for the production of cyclic oxygen compounds which consists in heating in the absence of added free hydrogen to temperatures ranging from 80° to 400° C. alicyclic mono amino compounds, containing six-membered carbocyclic rings, the rings being free from substituents other than those containing exclusively carbon and hydrogen atoms, in the presence of an excess of water and in the presence of copper.

WILLI SCHMIDT.
KARL SEYDEL.